Dec. 31, 1940.   H. L. COOKE   2,227,126
BRUSH AND MANUFACTURE THEREOF
Filed March 2, 1934   7 Sheets-Sheet 1

INVENTOR
H. L. COOKE
BY Moses + Nolte
ATTORNEYS

Dec. 31, 1940.   H. L. COOKE   2,227,126
BRUSH AND MANUFACTURE THEREOF
Filed March 2, 1934   7 Sheets-Sheet 2

INVENTOR
H. L. COOKE
BY Moses & Nolte
ATTORNEYS

Dec. 31, 1940.　　　H. L. COOKE　　　2,227,126
BRUSH AND MANUFACTURE THEREOF
Filed March 2, 1934　　　7 Sheets-Sheet 3
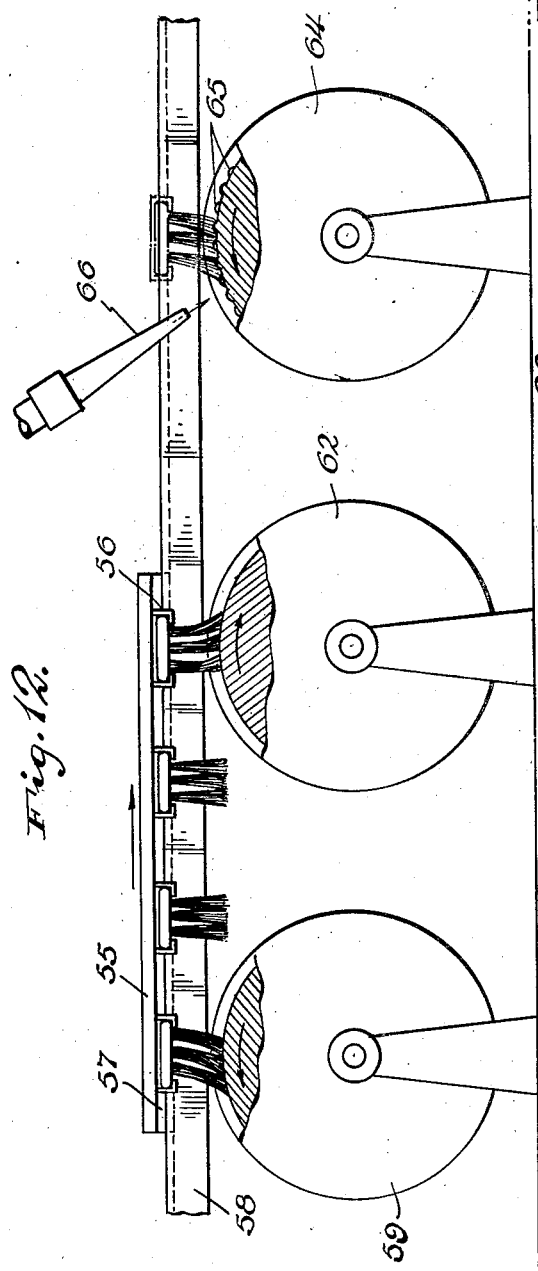
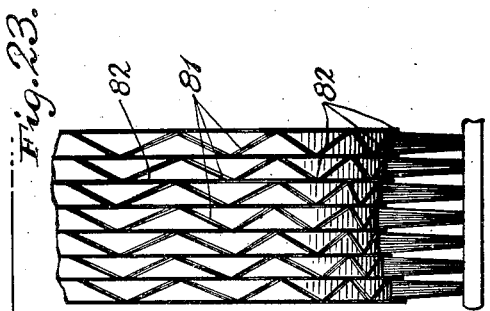
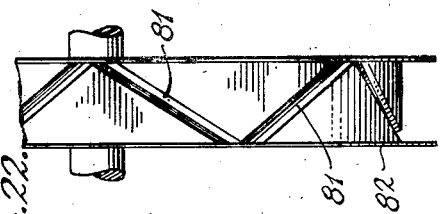
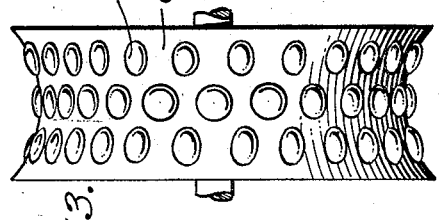
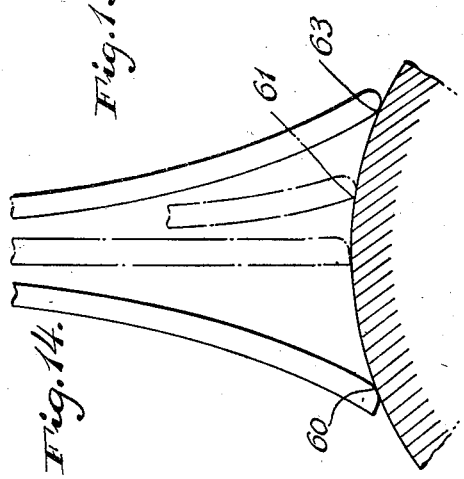
INVENTOR
*H. L. Cooke*
BY *Moses & Nolte*
ATTORNEYS Dec. 31, 1940. H. L. COOKE 2,227,126
BRUSH AND MANUFACTURE THEREOF
Filed March 2, 1934  7 Sheets-Sheet 4
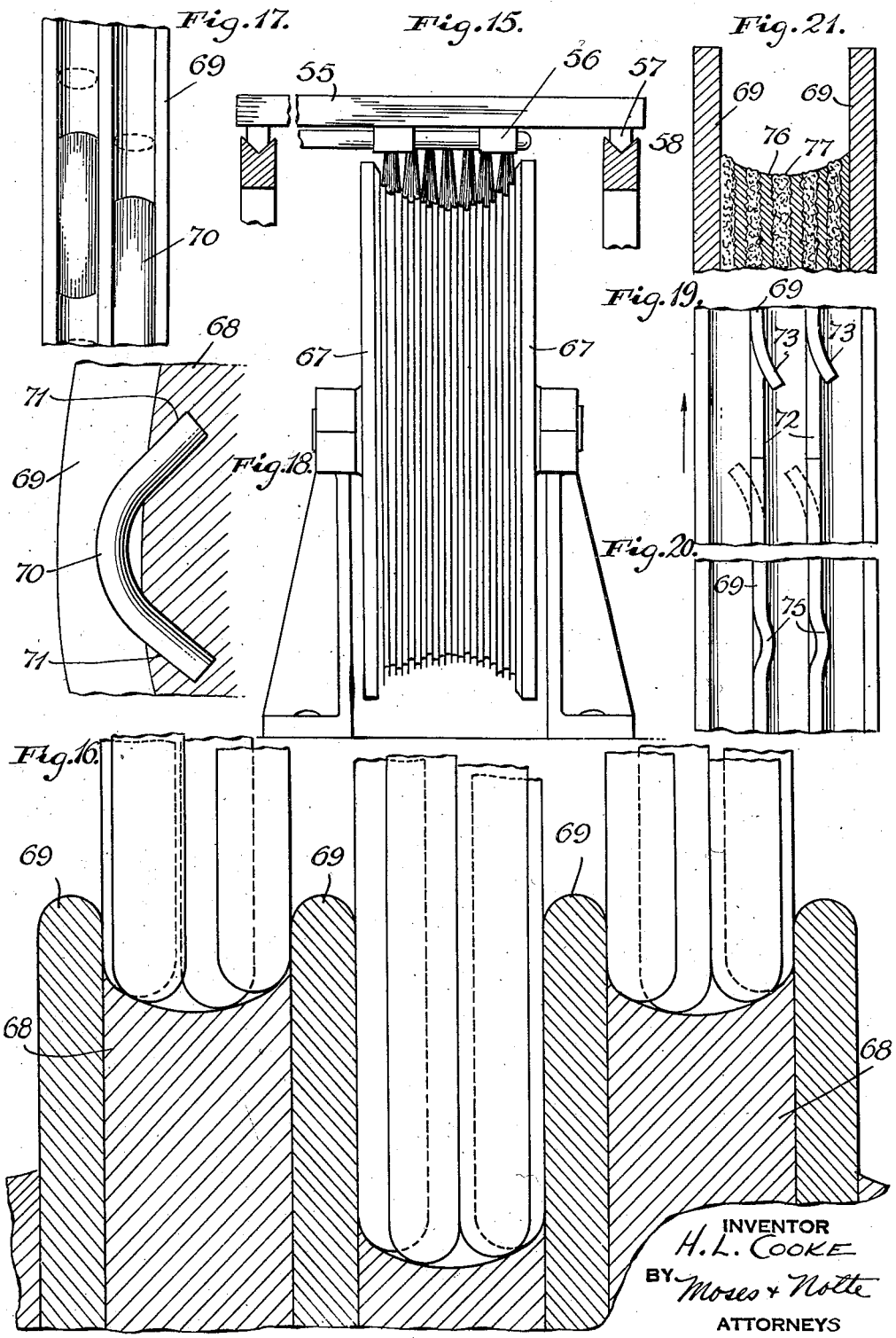

Dec. 31, 1940.  H. L. COOKE  2,227,126
BRUSH AND MANUFACTURE THEREOF
Filed March 2, 1934  7 Sheets-Sheet 5
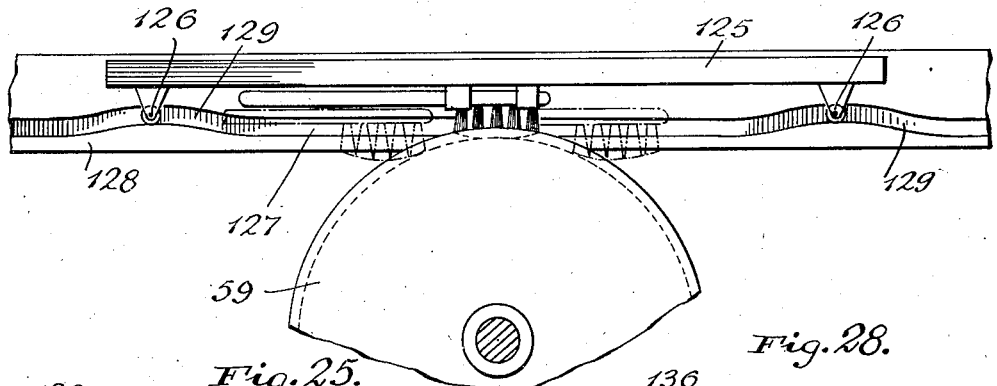
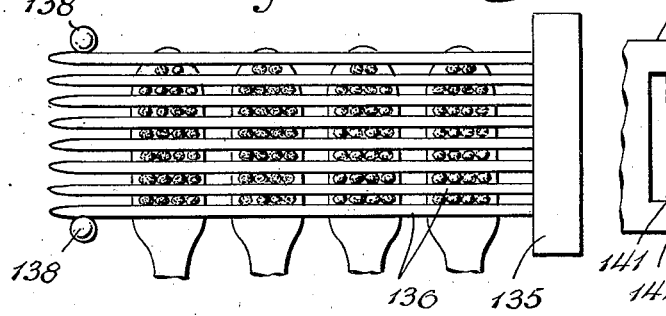
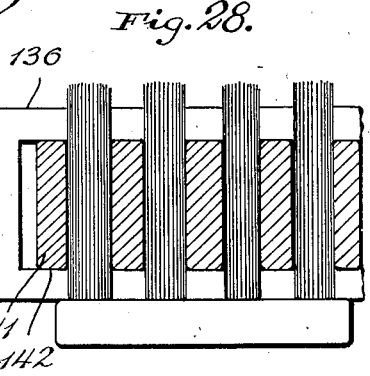
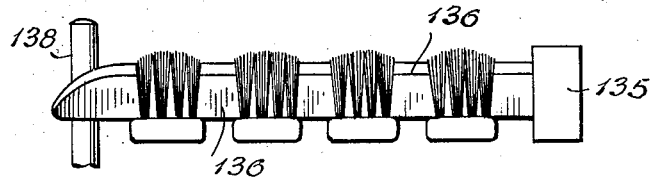
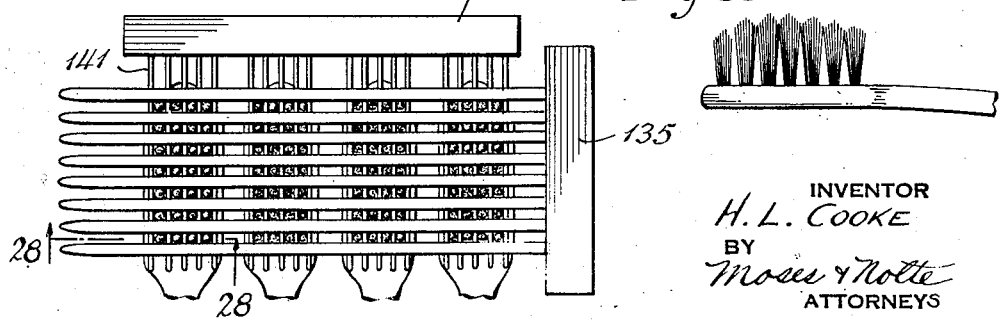
INVENTOR
H. L. COOKE
BY
Moses & Nolte
ATTORNEYS

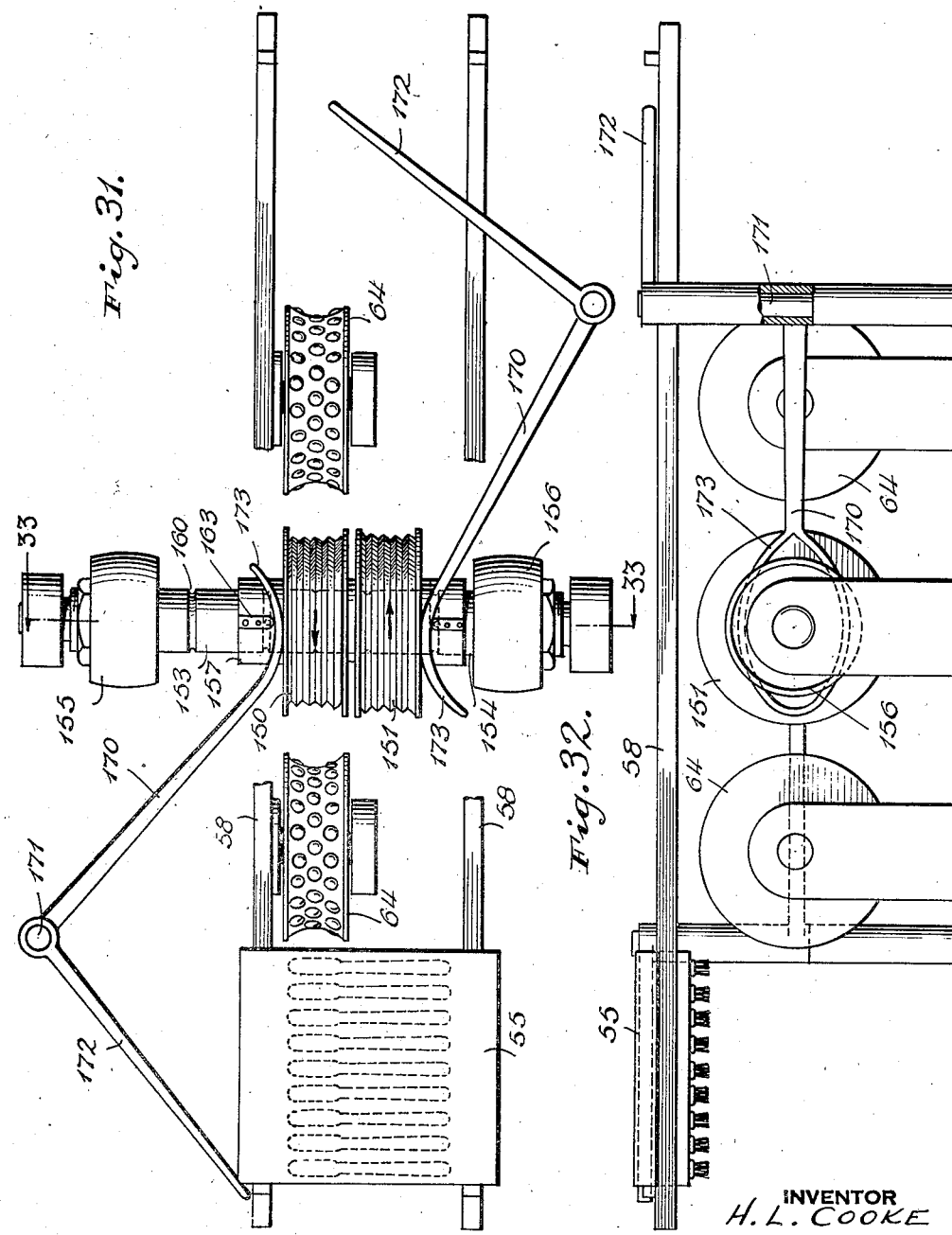

Dec. 31, 1940.  H. L. COOKE  2,227,126
BRUSH AND MANUFACTURE THEREOF
Filed March 2, 1934  7 Sheets-Sheet 7
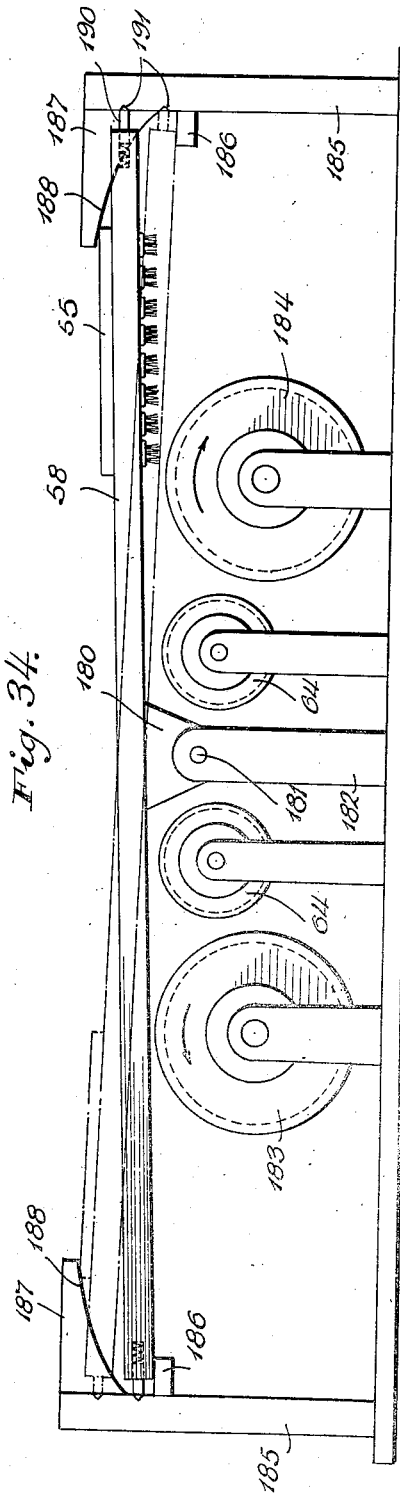
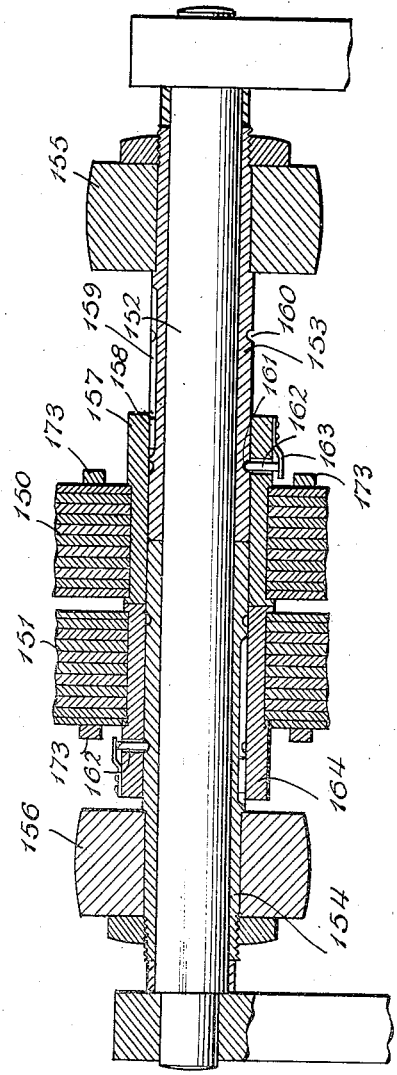
INVENTOR
H.L. COOKE
BY Moses & Nolte
ATTORNEYS Patented Dec. 31, 1940

2,227,126

UNITED STATES PATENT OFFICE 2,227,126

BRUSH AND MANUFACTURE THEREOF

Hereward Lester Cooke, Princeton, N. J.

Application March 2, 1934, Serial No. 713,669

17 Claims. (Cl. 51—281)

This invention relates to the manufacture of brushes made with bristles, and its objects are to improve the usefulness, wearing qualities, and appearance of such brushes. The invention includes an improved formation of the ends of the bristles, and improved methods and apparatus for producing such formation.

While the invention is applicable to bristle brushes generally, it finds a particular field of usefulness as applied to tooth brushes, and it is an important object of the invention to produce a tooth brush which, while effective for cleaning the teeth, cannot injure the gums.

In tooth brushes and other bristle brushes as commonly manufactured, the bristles are cut off to the shape of the brush by some form of cutting knife. This cutting operation leaves the tips of the bristles rough and jagged and frequently having chisel-like points. In some instances the tips of the bristles split, and when the brush is used the incipient cracks or splits in the ends of the bristles will rapidly open to a point where the bristles lose their usefulness. The sharp, chisel shaped points of tooth brush bristles, especially when the brush is new, tend to abrade or scratch the gums, thereby producing a condition in which the gums are particularly susceptible to attack by bacteria. When the brush has been used for a time the sharp points of the bristles absorb moisture and become soft so that they bend over and are ineffectual for cleaning the teeth.

The objects of the invention are accomplished by properly grinding the ends of the bristles to a uniform smooth and usually rounded form. I have found that in grinding the ends of the bristles it is very important to avoid side grinding or tapering of the bristles, it being necessary to grind the bristles in such a way that only the tip ends are smoothed off and rounded slightly, so that the ends shall be smooth, but the bristles shall retain their full diameters up to the base of the rounded tips. Preferably the rounding of the bristle is carried to an extent where the tip of the bristle is of no greater curvature than a hemisphere, and it may be somewhat flatter than this if properly smoothed so as to avoid sharp corners.

Grinding of the bristles in such a way, and to such an extent, as to taper the bristles gradually towards the ends is objectionable as it renders the tapered ends of the bristles too flexible, so that when the bristles get wet such ends will bend over and the brushing will be accomplished by the sides rather than the tips of the bristles. This prevents a proper brushing action in tooth brushes and the like. The tapering of the bristles also results in grinding away the skin, or outer sheath, of the bristles which is extremely thin, but hard.

In order to accomplish the grinding of the bristles to the proper shape and extent special methods and apparatus are necessary and these are provided by my invention.

The bristles having ground tips formed in accordance with this invention are very effective for brushing as there are no jagged corners to injure the gums in the case of a tooth brush, and owing to the smooth formation of the tips of the bristles there is practically no tendency for the bristles to split in use. The firm, rounded tips of the bristles are very effective when used with an abrasive or polishing substance, such as tooth paste or powder, as they apply such an agent in the most advantageous manner to the surfaces of the teeth. A much more satisfactory action of the powder or paste is thus secured than in the case of a brush having jagged or pointed bristles. The smooth rounded ends of the bristles also provide a brush having the maximum durability and a superior appearance and feeling to the touch.

In the accompanying drawings which illustrate certain preferred embodiments of the invention:

Figure 12 is a diagrammatic view in elevation showing a pair of grinding wheels and a cleaning wheel, tracks mounted above the same and a carrier mounted on said tracks having a plurality of brushes mounted thereon.

Figure 13 is an edge view of the cleaning wheel.

Figure 14 is a diagrammatic view in elevation on an enlarged scale showing the action of the grinding wheel on the bristles.

Figure 15 is a view in elevation showing a grinding wheel embodying another form of my improved apparatus and showing a tooth brush in process of being ground thereby, a portion of the tooth brush carrier being broken away and guides for the carrier being shown in section.

Figure 16 is a view in vertical section on an enlarged scale of a portion of the grinding wheel shown in Figure 15.

Figure 17 is a view of the face of a part of another form of grinding wheel showing deflectors for the bristles.

Figure 18 is a view in section of the part of the periphery of the wheel shown in Figure 17, the section being transverse to the axis of the wheel.

Figures 19 and 20 are views similar to Figure 17 showing modified constructions for agitating the tips of the bristles during grinding.

Figure 21 is a view in section of a portion of a modified construction of grinding wheel.

Figure 22 is a view in elevation of a portion of another grinding disc of modified construction.

Figure 23 shows a wheel built up of discs such as shown in Figure 22, with a brush in engagement therewith.

Figure 24 is a diagrammatic view in elevation showing a grinding wheel and brush carrying means arranged to feed the brush across the wheel in a curved path adapted to grind the brush to a curved contour.

Figures 25 and 26 are diagrammatic views in plan and side elevation respectively showing a bristle supporting means adapted to hold or space the tufts of bristles while the bristles are being cut or ground.

Figure 27 is a view similar to Figure 25 showing a modified construction in which the bristle tufts are held on all four sides.

Figure 28 is an enlarged fragmentary sectional view on line 28—28 of Figure 27.

Figure 29 is a diagrammatic side elevation of a brush having a holder such as shown in Figure 26 applied thereto and showing a cutter about to trim the bristles thereof.

Figure 30 is a similar view of the brush after trimming and with the holder removed.

Figure 31 is a diagrammatic plan view of an arrangement of grinding wheels and brush carrying means, whereby the bristles are ground by a wheel rotating in one direction when the brush-carrier is moved from left to right and by a wheel rotating in the opposite direction when the brush-carrier is moved from right to left, instead of the brushes being passed successively over a pair of wheels rotating in opposite directions as in the construction shown in Figure 12. Parts of the tracks for the brush-carrier are broken away.

Figure 32 is a side elevation of the apparatus shown in Figure 31.

Figure 33 is a vertical sectional view on line 33 of Figure 31, the tracks being omitted and parts of the grinding wheels being broken away.

Figure 34 is a diagrammatic side elevation of a modified form of apparatus for accomplishing a result similar to that shown in Figure 31.

Figure 1:
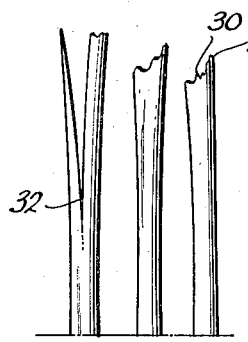
Figure 1 is a view in side elevation showing typical bristles having jagged ends as produced by the ordinary cutting operations now commonly used in the manufacture of tooth brushes, and showing one bristle split as the result of use in the rough tipped condition.

Referring to the drawings in detail, the bristles shown in Figure 1 are illustrative of typical bristles found in tooth brushes which have been trimmed by the usual trimming knives. Such bristles are usually cut off at the top on a more or less irregular incline as shown at 30, and the corner of the bristle which is reached last by the cutter frequently projects in a point or chisel shaped edge 31. It will be apparent that a brush with bristles of this shape will, when stiff, present a series of sharp points or edges which are almost certain, at times, to scratch or lacerate the gums. After the bristles have become soaked with water, particularly after the brush has been used a few times, these points may become soft and will bend over, so that a proper end contact of the bristles to secure the best brushing effect cannot be obtained. Furthermore, it will be seen that points of this kind will not properly apply polishing paste or powder to the surfaces of the teeth. In many instances, a jagged end of the bristle will split so that the bristle will sooner or later have the appearance of the bristle 32, Figure 1. With such a bristle the split portions will absorb moisture and soon become soft so that the bristle is practically useless.

Figure 2:
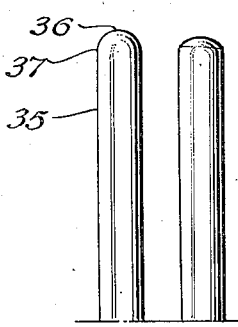
Figure 2 is a view showing typical bristles ground in accordance with my invention.

In accordance with my invention, I form the bristles with smooth rounded ends, such as illustrated in Figure 2. The body of the bristle 35 is untouched by the grinding means, only the end 36 being ground into a rounded or dome shape, which meets the substantially cylindrical body of the bristle at 37. In grinding the rounded or dome shaped ends of the bristles it is important to avoid grinding the side of the bristle beyond the point 37, as such grinding tends to remove the hard outer skin of the bristle, and also to taper the bristle so that the tip will lose some of its stiffness. So long as the rounding of the bristle is confined to a curvature substantially hemispherical or less, the tip of the bristle retains its stiffness. The round tip of the bristle is of ideal shape for applying a polishing powder or paste, as in the case of a tooth brush or other polishing brush, and is also the best form for any other type of stiff bristle brush, such as a clothes brush, hair brush, nail brush or the like. There are no sharp or jagged points on the bristles which can give rise to splitting thereof, or which can injure the skin of the gums, the scalp or any delicate tissue or fabric. The ends of the bristles may be rounded by grinding upon an abrasive surface or wheel which gives a very satisfactory finish, or if desired a polishing or buffing operation may also be utilized which will put a high polish on the tip of the bristle.

Figures 4, 5:
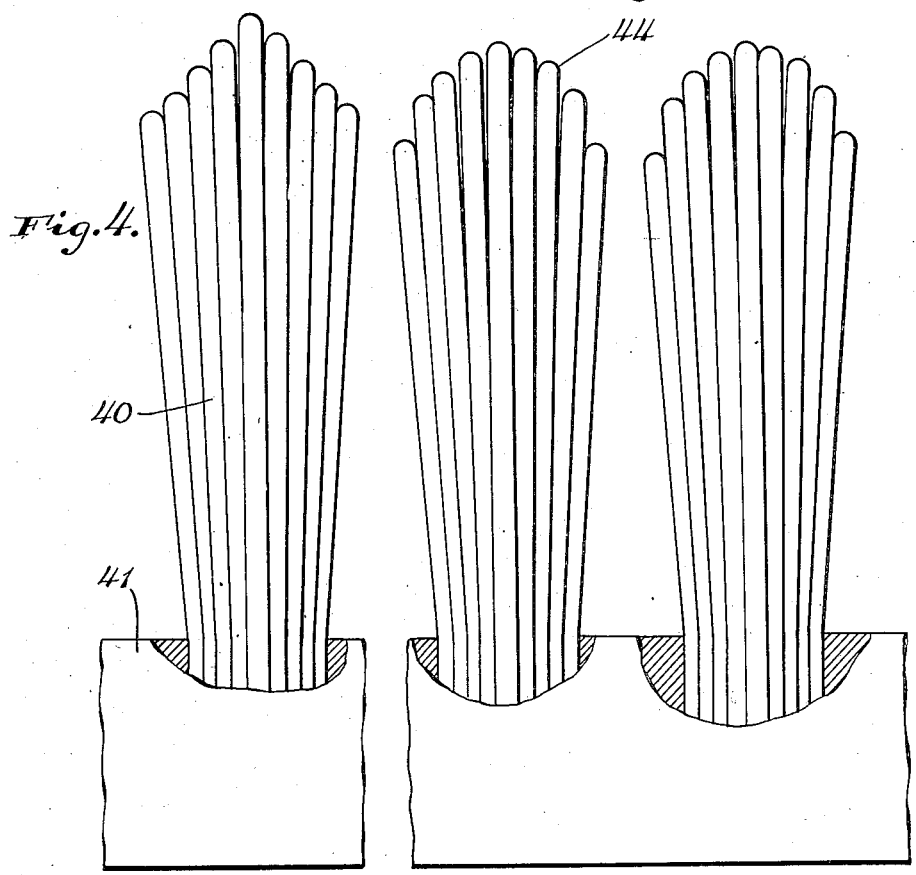
Figure 4 is a view of a tuft of bristles in a tooth brush, the bristles being graduated in length so as to provide a pointed tuft, the tips of the bristles being rounded in accordance with my invention.
Figure 5 is a similar view showing two tufts of bristles graduated in length so as to form tufts having rounded ends, the tips of the individual bristles also being rounded.

In ordinary brushes the bristles are mounted in tufts which are set in holes in the holder or back of the brush. For instance Figure 4 shows a tooth brush tuft 40 of typical shape mounted in the holder 41. The upper end of the tuft may be of wedge shape with the bristles at the sides of the tuft shorter than the bristles in the middle. Ordinarily a row of three or four tufts is mounted in line transversely to the brush, the wedge shaped contour extending transversely to the axis of the brush.

Figure 5 shows a different form for the contour of the tuft and a form which I prefer to that shown in Figure 4. In Figure 5 the top of the tuft is arch shaped as indicated at 44. The tufts are set in rows of this contour extending transversely to the axis of the brush. In some instances it may be desirable to have a double curvature at the top of each tuft so that each tuft is of a dome shaped contour, but ordinarily this is unnecessary.

Figure 3:
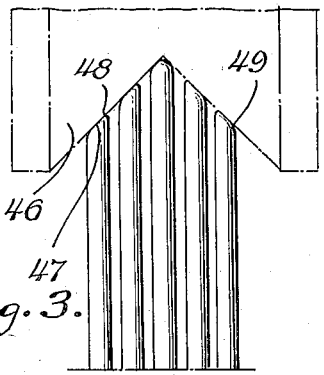
Figure 3 is a view showing an incorrect method of grinding bristles by which the bristles are more or less ground off on the sides and also have sharp corners or chisel-like points.

In accordance with my invention each bristle in the tuft is ground so as to have a dome shaped tip of substantially the form shown in Figure 2. In the manufacture of a brush it is possible to grind the tips of the unmounted bristles to proper shape, and then mount them in tufts in the holder, but the usual manner of making brushes is to mount the tufts of bristles in the holder and then trim them to the desired contour. I prefer to follow the same procedure and then to grind the roughly trimmed tips of the bristles. In performing this grinding operation it is important that each bristle shall be treated individually, so to speak, so as to produce a rounded curvature on the end of each bristle. In grinding the bristles of a tuft having a wedge shaped contour, as shown in Figure 4 for instance, it is not sufficient merely to bring the tips of the bristles into contact with a grinding wheel having a groove of the corresponding contour therein, as indicated at 46 in Figure 3. The effect of such a grinding operation would be to grind the ends of the bristles to a chisel shape as indicated at 47. This, it will be seen, would form the bristles with objectionable points 48, more or less similar to the points formed by the usual cutters. Furthermore, the outer sides of the bristles would be ground down too far at the point 49, so that they would be more or less tapered on one side. I overcome this difficulty by grinding the bristles in such a way that each bristle is ground so as to have a smooth rounded tip.

In Figures 6 to 10 is shown one construction of wheel for grinding the bristles so as to secure the desired round formation of the bristle tips. The grinding wheel shown in these figures is built up of a series of abrasive discs 50 mounted on an arbor 51 and preferably clamped between metal side plates 52. Any suitable material may be utilized for making the abrasive discs, such for instance as carborundum with a binder of shellac, Bakelite or vitreous material. Preferably the abrasive is not too coarse.

Figure 6:
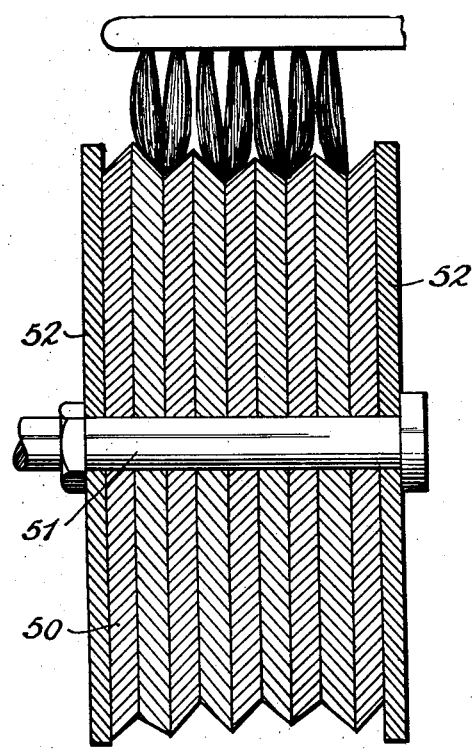
Figure 6 is a vertical sectional view of a grinding wheel embodying a preferred form of the improved apparatus and showing a tooth brush in process of being ground thereby.
Figure 7:
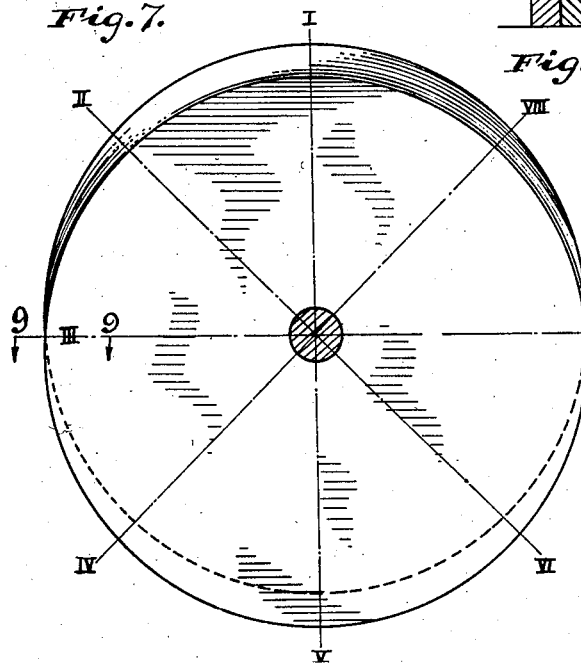
Figure 7 is a view in side elevation of one of the grinding discs of which the wheel of Figure 6 is made.
Figure 8:
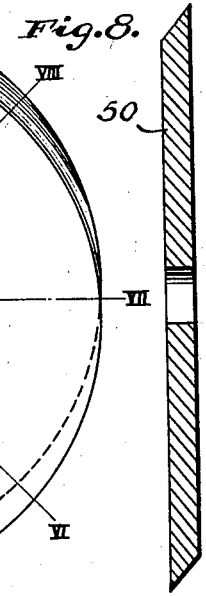
Figure 8 is a vertical sectional view of the disc shown in Figure 7.
Figure 9:
Figure 9 is a fragmentary horizontal sectional view on line 9—9 of Figure 7.

The edge of each of the discs is beveled in a peculiar manner as shown particularly in Figures 7, 8 and 9. Referring to Figures 7 and 8 the wheel is shown beveled in one direction at the top, as indicated by the position I on Figure 7, while at the bottom the wheel is beveled equally in the opposite direction at the position indicated by V on Figure 7. At intermediate positions, substantially at the ends of the horizontal diameter indicated by the positions III and VII of Figure 7 the periphery of the wheel is flat, that is parallel with the axis of rotation. This flat shape is shown in cross section in Figure 9. The bevel at the top merges gradually into the flat section at the horizontal diameter and finally into the opposite bevel at the bottom. Any suitable angle of maximum bevel is used, preferably about 45°. These discs are arranged in pairs placed oppositely, as shown in Figure 6, so that grooves are formed between the pairs of discs which as the wheel revolves reverse themselves, so to speak, as is clearly apparent from the series of sections, Figure 10. Where a brush of curved or irregular contour is to be ground, as shown, the discs vary slightly in diameter and in order to properly match up the successive pairs of discs, the flat points on adjacent discs of different diameters will be displaced slightly from exact diametrical relationship.

Figure 10:
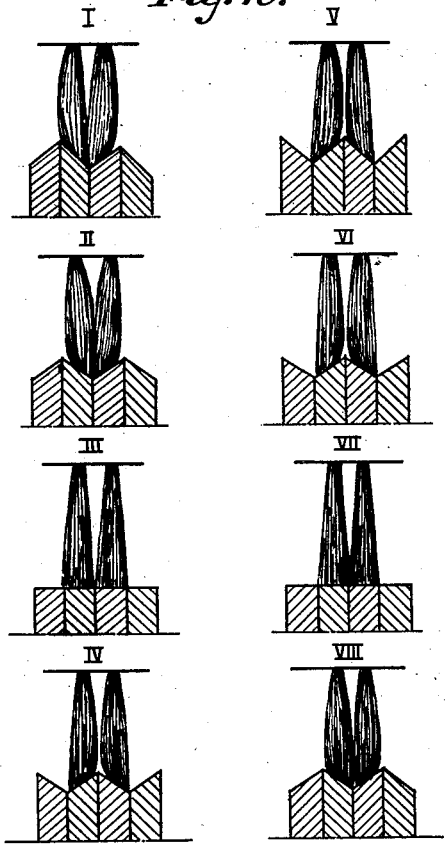
Figure 10 is a group of eight diagrams showing the action of the discs on two adjacent tufts of a tooth brush, the diagrams in Figure 10 being numbered I to VIII inclusive and corresponding with the angular positions numbered I to VIII on Figure 7.

The wheel is rapidly rotated and the brush moved across the same, the action of the changing bevels on the ends of the bristles being shown in Figure 10. It will be seen that in the position I the bristles are ground by 45° contact with the beveled surfaces of the discs. As the wheel rotates the angle of contact is gradually decreased as shown in positions II and III, the latter representing horizontal contact with the tips of the bristles. This position is immediately followed by angular contact with the surfaces of the discs which are now beveled in the opposite direction so that the tips of the bristles are ground from the opposite side in positions IV, V and VI from the positions in which they were first ground. As the wheel rotates this operation is rapidly repeated and the effect is to grind the bristle tips in a rounded form. It will be understood of course that as the bristle tips are moved back and forth by the changing bevels on the edges of the discs, they are moved around and agitated so that a substantially uniform grinding is secured.

As the several discs of which the wheel is built function as a unit it is obvious that the wheel might be built of a single block of abrasive having proper beveled surfaces formed thereon. The disc construction, however, is easier to make. Furthermore, instead of using a wheel, a body of abrasive material having surfaces corresponding in angularity to the surfaces of the wheel, developed, may be employed and relative reciprocation between the abrasive body and the brush utilized to do the grinding.

Figure 11:
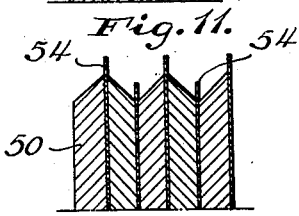
Figure 11 is a fragmentary transverse sectional view of a slightly modified form of grinding wheel.

In Figure 11 a modification of the grinding wheel described is shown in which the beveled grinding discs 50 are separated by spacer plates 54. The latter are made of smooth metal which will not be readily abraded such for instance as steel, and they are of somewhat larger diameter than the abrasive discs so as to form flanges projecting beyond the peripheries of the abrasive discs. These flanges space the bristles of one tuft from the bristles of the adjacent tuft, thereby retaining the bristles of each tuft in engagement with the corresponding abrasive disc and preventing such bristles from a possible spreading over into contact with an adjacent disc with which they might not contact at the desired angle.

The grinding wheels of form as described above, are preferably used in pairs, the two wheels of each pair rotating in opposite directions, as shown in Figure 12. The brushes may be brought into contact with the rotating wheels by hand, but preferably a series of brushes is mounted on a carrier of some form which can be reciprocated at a fixed distance from the rotating wheels either by hand or power. As illustrated, brush carrier plates 55 are provided, each of which carries a series of brushes held in clips 56. The carrier plates 55 are provided with guides 57 running in grooves in tracks 58. The tracks 58 are mounted in proper fixed relationship to the grinding wheels so that as the carrier plates are moved back and forth along the tracks, the brushes mounted thereon are brought into proper contact with the grinding wheels. According to Figure 12 it will be seen that as the carrier plate carrying the brush is moved towards the right for instance, the bristles of the brush will first come in contact with the periphery of the wheel 59 which is rotating in a counterclockwise direction. This will cause the right hand lower corner of a bristle to contact with the abrasive wheel and be ground off as shown at 60 in Figure 14. As the carrier plate and brush are continuously being moved to the right, the bristle will eventually pass beyond the highest part of the wheel and will be rounded off at the bottom as it passes over the wheel and eventually may contact the wheel beyond the highest point so as to be slightly rounded off at the point 61, Figure 14. As the carrier plate is moved further to the right the same brush will eventually come in contact with the grinding wheel 62 which is rotating in a clockwise direction. The rotation of this wheel will sweep the bristles toward the right as in the case of the brush shown above the wheel 62 in Figure 12. This will result in the opposite corners of the bristles being ground as shown at 63 in Figure 14. It will be understood that at each pass of the brush over the grinding wheel only a small amount of the bristles will be ground off and ordinarily the carrier plate and brush thereon will be reciprocated a number of times over the grinding wheel. Eventually each bristle will be reduced to the desired smooth, rounded form. At the same time that the brush is being moved back and forth over the two wheels, as shown in Figure 12, it will be understood that the individual bristles of the tufts are being worked back and forth in the grooves of each grinding wheel in a direction parallel with the axis of the grinding wheel, as already described, so that the grinding of the bristles will be from all directions, resulting in the production of a dome shaped or hemispherical tip.

It will be understood that the brushes are moved over the grinding wheel in a path sufficiently close to the latter to enable the shorter bristles of the tufts to contact and be ground by the surfaces of the wheels. The longer bristles will not interfere with this being done, as they will simply be bent over more by contact with the rotating surfaces of the wheels. All the bristles will thus be rounded off, although the longer bristles will usually be rounded to a little greater degree of curvature than the shorter bristles. This, however, does not prevent the obtaining of a proper result.

The grinding of the bristles produces a certain amount of bristle dust which tends to adhere to the brush. Any suitable means may be utilized for cleaning the brush after grinding, but I have shown in connection with the grinding apparatus a convenient construction for assisting in the dust removal. This construction is shown in Figures 12 and 13, and comprises a rapidly rotated cleaning wheel 64 having a concave surface in which are mounted a large number of polished knobs or buttons 65 of suitable hard material such as stainless steel. As the brush is passed over this wheel the buttons agitate the bristles and knock the dust from them. If desired a compressed-air jet 66 may be used in conjunction with this wheel so as to assist in removing the dust from the bristles.

In Figures 11 and 16 I have shown another form of grinding wheel. This comprises side plates 67 between which are clamped a plurality of abrasive discs 68 and spacer plates 69. The abrasive discs may be made of any suitable material such as a relatively fine grade of carborundum with a binder of shellac, Bakelite or vitreous material. The peripheries of the discs are preferably concave and the width of each disc is preferably somewhat wider than the maximum diameter of the bristles. As shown in Figure 16 the width of the disc is from two to three times the average bristle diameter. The spacer plates are made of smooth metal and as thin as is consistent with reasonable service. In the particular construction shown in Figure 16, the abrasive disc are approximately ¼ in. thick, and the spacer discs 1/16 in. thick. A series of abrasive discs and spacers are provided for each tuft, three abrasive discs being shown to each tuft in the wheel shown in Figure 15. In the ordinary tooth brush a tuft may comprise some thirty or forty bristles so that several bristles are received in each of the grooves formed between the spacer discs. In order to prevent the tips of the bristles from simply falling into fixed positions in the grooves which might result in the tips of the bristles being ground so that they would merely fit the contour of the particular part of the abrasive wheel which they happened to engage, means are provided to keep the bristles in a state of agitation so that they will move back and forth in the grooves and thereby become rounded on all sides. For this purpose various means may be provided which will cause the bristles to jump or move around in the grooves or from groove to groove.

A preferred and very simple construction for this purpose is shown in Figures 17 and 18. In accordance with this construction I form humps in the bottoms of the grooves by mounting bent pieces of wire 70 therein. These pieces of wire can very easily be mounted in position by cutting saw kerfs 71 at intervals in the peripheries of the abrasive discs 68. The bent pieces of wire are fitted in these kerfs, as the wheel is being built up by laying together alternate abrasive discs and spacer discs, and when the wheel is fully assembled obviously the ends of the pieces of wire will be locked in the saw kerfs between adjacent spacer discs so that they cannot escape. The curved parts of the pieces of wire which project into the grooves between the spacer discs will cause the bristles to jump and move around in the grooves as the wheel is rapidly rotated, and thereby will produce uniformity of grinding of the tips of the bristles. Any other means for producing an irregularity in the grinding surfaces may be utilized. For instance the surface of the abrasive wheel itself might be formed with irregularities.

In Figure 19 another construction for causing the bristles to move around is illustrated. In this instance the edges of the spacing discs 69 which project beyond the abrasive discs have slots 72 cut in them and the trailing edges of the projecting flanges of the spacer discs adjacent to the slots are bent laterally as shown at 73, so as to form deflectors. As the wheel revolves in the direction of the arrow in Figure 19, it will be seen that, the deflectors will tend to deflect the bristles so that some of the bristles which have been running in one of the grooves will be deflected into the adjacent groove during one or more revolutions of the wheel, after which some of the bristles will spring back again to their original groove and others will be deflected. In this way the bristles will be kept in continual motion.

Figure 20 shows a slightly modified construction for accomplishing the same result. In this construction, instead of the discs 69 being actually slotted and having means for deflecting the bristles from one groove to another, they are merely provided with deflecting humps 75 which will cause the bristles to travel back and forth in the groove.

Instead of using a hard grinding wheel such as a carborundum or emery wheel, any other suitable method of grinding may be utilized such as by means of a wheel fed with abrasive powder. Another form of wheel that may be used is composed of layers of paper or fabric coated or impregnated with an abrasive. For instance as shown in Figure 21, the abrasive part of the wheel may be formed of layers of paper or cloth 76 coated with an abrasive substance such as the carborundum grains 77. As the cloth wears down a sufficient amount of the abrasive is exposed at all times to do the grinding. Figure 21 shows one of the grinding units composed of five layers of paper or cloth with a metal spacer disc 69 on each side thereof. It will be understood that a suitable number of these units will be utilized to make the proper size of grinding wheel.

Figures 22 and 23 show another arrangement for causing the movement of the bristles relative to the grinding surface resulting in the grinding of the tips into a rounded form. In accordance with the construction shown in these figures the abrasive wheels 80 are provided with a series of diagonal V-shaped grooves 81 which will engage the tips of the bristles and cause them to weave back and forth at the same time grinding both corners of the bristles. In accordance with this construction a series of abrasive wheels will be used corresponding in number to the number of rows of tufts, each disc being separated from the adjacent discs by a metal spacer disc 82. For instance in the size of tooth brush shown in Figure 23 there are seven abrading discs each approximately ⅛ inch thick and eight spacer discs (inclusive of the two outside discs) approximately ½₄ inch thick. These dimensions are, of course, only illustrative and may be varied to suit circumstances.

In Figure 24 I have shown diagrammatically an arrangement for mounting the brush so as to move it in a curved path and thereby grind the brush into a curved contour. For instance when viewed from the side, the brush shown in Figure 24 has longer bristles in the middle tufts than in the end tufts. In order to grind this contour, the brush is mounted on a brush carrier plate 125 which is provided with laterally projecting pins 126 at the corners. These pins run in grooves 127 in rails 128, the grooves having curved portions 129. As the carriage is moved back and forth to reciprocate the brush over the grinding wheel 59, it will be seen that the brush is moved up and down as the pins ride in the curved grooves, so that the brush first occupies the dotted position shown at the left hand side of the grinding wheel and then rises as it moves along to the full line position and then descends again to the dotted line position shown at the right hand side of the wheel. By properly curving the grooves any desired contour of brush may be ground.

One of the difficulties which has been encountered in trimming the tips of brush bristles to a proper contour arises from the fact that while the bristles are firmly mounted at their butts in the holder, the ends of the bristles which are to be trimmed are displaced by contact with the cutters and thereby accurate trimming is impossible. When the cutter contacts the ends of the bristles, it pushes the bristles into a certain position in which the cutting takes place and then, as the cutter passes by, the bristles spring back to another position, so that the tip of the tuft is of irregular shape and does not conform to the contour of the cutter. In Figures 25 to 29 I have shown a means for remedying this difficulty. Figure 25 shows a series of brushes in the position in which they are mounted upon the carrier plate. In order to support the bristles more firmly near their tips, I have provided a bristle holder comprising a base 135 having a plurality of teeth or blades 136 projecting therefrom which are adapted to be inserted between the rows of tufts. These blades reach nearly to the point where the tufts are to be cut, as shown in Figure 29, and thus support the tufts in firm and compact form, while the tips are trimmed off by the cutter, as indicated diagrammatically in Figure 29 at 137. After the cutting has taken place, the blades are withdrawn and the brush assumes the general form shown in Figure 30. If desired, the outer ends of the spacer blades may be firmly supported in position by engagement with fixed supports, such as the pins 138 shown in Figures 25 and 26. In instances where still further support for the tufts is desired, a double set of supporting blades may be utilized as shown in Figures 27 and 28. In this instance a second blade carrier 140 is utilized which is provided with blades 141 adapted to pass between the longitudinal rows of tufts and through openings 142 in the first set of blades 136. Each tuft is thus locked in a square frame, so to speak, while it is being cut.

The means for holding the tufts while trimming may be used to improve the trimming of the bristles in the brush, whether the bristles are afterwards subjected to a grinding operation or not. Where the bristles are to be ground as previously described, accurate trimming is desirable as it reduces the amount of grinding necessary to bring the brush to the proper form. In practice, however, I have usually found that the ordinary trimming operation as now performed without the use of the tuft supporting means described, is sufficient and that a very moderate amount of grinding will produce a brush of very superior finish and evenness of appearance in which the tips of substantially all the bristles are rounded in the manner described.

In Figure 12 an arrangement of grinding wheels is illustrated whereby the brushes are reciprocated back and forth over a pair of wheels rotating in opposite directions, the brushes being ground by both wheels at each passage. In some instances it is desirable to present the bristles only to a wheel rotating in a given direction with respect to the direction of the travel of the brushes at the time the bristles contact with the wheel. Preferably the bristles are brought into contact with a wheel rotating against the direction in which brushes are being moved. This result may be accomplished by using a single grinding wheel and reversing the direction of its rotation at each passage of the brushes, but preferably means are provided for causing the brushes alternately to engage wheels constantly rotating in opposite directions.

In Figures 31, 32 and 33 I have shown a construction by which the desired result may be accomplished. As here illustrated the brushes are mounted on a carrier plate 55 running on tracks 58 as in the construction shown in Fig. 12. A pair of grinding wheels 150 and 151 are provided which are mounted side by side and driven in opposite directions and mechanism is provided for moving one or the other of these wheels upon its axis into the path of travel of the bristles. A transverse shaft 152 is mounted under the tracks 58 and on this shaft are two rotatable sleeves 153 and 154. The sleeve 153 is arranged to be driven constantly in one direction and the sleeve 154 in the opposite direction, suitable means being provided for this purpose, such as the pulleys 155 and 156 fixed to the outer ends of the sleeves. The grinding wheel 150 is mounted on a sliding sleeve 157 which is mounted to slide longitudinally on the rotating sleeve 153 and is caused to rotate with said sleeve by means of a key 158 working in a spline 159. The sliding sleeve 157 can be reciprocated between two positions on the sleeve 153, these positions being defined by grooves 160 and 161 in the sleeve 153 into one or other of which a detent pin 162 mounted on the sliding sleeve 157 is adapted to engage. The detent pin is caused to yieldingly engage the groove by means of a spring 163. The grinding wheel 151 is carried by a sliding sleeve 164 which is mounted on the rotating sleeve 154 in the same way that the sleeve 157 is mounted on the sleeve 153. Means are provided for pushing one or the other of the grinding wheels into the path of travel of the bristles, the means illustrated for this purpose comprising the arms 170 of bellcrank levers pivoted respectively on pivots 171, the other arms 172 of the bellcrank levers projecting into the path of travel of the carrier plate 55 near the respective ends of its travel. The arms 170 terminate in curved loops 173 which bear against the sides of the grinding wheels. Assuming that the brush carrier plate 55 is at the left hand end of its travel as shown in the Figure 31, it will be seen that the grinding wheel 150 has been pushed into the path of travel of the bristles. As the carrier plate is moved to the right, as shown in this figure, it will be seen that the bristles will pass in contact with the grinding wheel 150 which is rotating in the direction shown by the arrow, that is against the direction of movement of the bristles. During this passage of the carrier plate, the grinding wheel 151, while constantly rotating, is out of action. When the carrier plate reaches the right hand end of its travel it engages the arm 172 of the bellcrank, the arm 170 of which is in engagement with the grinding wheel 151, and it will thereby cause the two grinding wheels to be pushed transversely so that the grinding wheel 150 is pushed out of the path of the bristles and the wheel 151 is brought into such path. As the carrier plate is now moved towards the left, the bristles will pass over the grinding wheel 151.

For cleaning the dust from the bristles a pair of cleaning wheels 64 are preferably provided, one mounted at each side of the axis of the grinding wheels.

Figure 34 shows a modified construction for accomplishing the same result as that of the construction shown in Figures 31, 32 and 33. In accordance with this construction, the brush carrier plate 55 is mounted on rails 58 which are carried by a central support 180 pivoted at 181 to a standard 182. A pair of grinding wheels 183 and 184 is provided, the wheels being arranged in the same longitudinal plane. With the tracks inclined as shown in full lines in Figure 34 the carrier plate 55 will be started from the left hand end of the rails and moved to the position shown. During this movement the tips of the bristles will be brought in contact with, and ground by the wheel 183 which is rotating against the direction of movement of the carrier plate. Owing to the inclination of the tracks the bristles will clear the second wheel 184. On the reverse movement of the carrier plate from right to left the tracks will be tilted to the dotted line position and tips of the bristles will therefore be ground by the wheel 184 and will clear the wheel 183. The desired tilting movement of the tracks may be accomplished by hand or in any suitable manner. As illustrated, a standard 185 is mounted at each end of the machine, each standard having a stop 186 to limit the downward tilting movement of the tracks and a cam member 187 which projects into the path of travel of the carrier plate 55. At the end of its movement the carrier plate 55 engages with the cam surface 188 of one of these members, and thereby causes the corresponding ends of the tracks to be pushed down so as to reverse the inclination of the tracks. For holding the tracks in one or the other of the inclined positions during the travel of the carriage, each end of the tracks is provided with a spring detent 190 which is adapted to engage in one or other of a pair of notches 191 formed in the standards 185.

For cleaning the bristles after they have passed over the grinding wheels, a pair of cleaning wheels 64 is preferably provided.

While I have illustrated and described in detail certain preferred apparatus by which my invention may be practiced, it is to be understood that changes may be made therein and the invention carried out in other ways than as particularly specified. I do not therefore desire to limit myself to the use of the specific apparatus or construction illustrated, but intend to cover my invention broadly in whatever form its principle may be utilised.

I claim:

1. The method of grinding the tips of brush bristles which consists in separating the bristles into groups, bringing each group into contact with an abrasive wheel of an appropriate diameter for grinding such group, and protecting the bristles of one group from side grinding by the grinding means for the adjacent group, and causing the bristles of each group to weave across the surface of the grinding element for such group.

2. A grinding wheel for grinding the tips of brush bristles, said wheel having grinding zones thereon, the grinding surfaces of which vary in inclination to the axis of the wheel at different points in the circumference of the wheel.

3. A grinding wheel for grinding the tips of brush bristles, said wheel having grinding zones thereon, grinding surfaces of which vary in inclination to the axis of the wheel at different points in the circumference of the wheel, the inclination being equal but opposite at opposite ends of a diameter, the wheel comprising a plurality of said grinding zones so arranged that the point of maximum inclination of one zone in one direction is adjacent to the point of maximum inclination of the adjacent zones in the opposite direction.

4. A grinding wheel for grinding tips of brush bristles and the like comprising a plurality of abrasive discs, each disc having a grinding surface of varying angularity with respect to the axis of the wheel, the angularity of each grinding surface varying at different points in the circumference of the wheel.

5. In apparatus for grinding the tips of brush bristles, a pair of grinding wheels, means for rotating the same in opposite directions, a brush carrier, and means for mounting the brush carrier adjacent to said grinding wheels so that a brush carried thereby may be reciprocated over said wheels in such position that the tips of the brush bristles will be brought in contact with the wheels alternately.

6. The combination with means for trimming the tips of brush bristles of a series of blades adapted to be inserted between and in embracing relation to the tufts of the brush so as to support the same from opposite sides and hold them in upright positions while the bristles are being trimmed.

7. The method of producing dome-shaped tips on brush bristles which consists in applying the tips of the bristles to a moving grinding element and moving the brush body in a predetermined path and in predetermined spacial relation to the grinding element, and deflecting the bristle tips while in contact with the grinding element to and fro laterally of said predetermined path to cause the points of grinding to shift progressively circumferentially of the bristles.

8. The method of producing dome-shaped tips on the bristles of a brush which consists in moving the brush back and forth in a predetermined path adjacent a rotary grinding element so as to alternately grind off the corners of opposite sides of the bristle tips, and deflecting the bristle tips while in contact with the grinding element to and fro laterally of said predetermined path to cause the points of abrasion to shift progressively circumferentially of the bristles.

9. The method of grinding the working tips of the bristles of a brush to smooth, blunt, rounded form, which consists in moving the brush through a grinding zone in a predetermined path so spaced from the grinding element that the free ends of the bristles are caused to bear against the surface of the grinding element and variably flex the bristles as they pass the grinding element so as to progressively change the areas and angles of grinding contact between the ends of the bristles and the grinding element to smooth and round the end faces of the bristles.

10. In a method of grinding the ends of groups of bristles, such as the bristles of a tooth brush, to smooth, dome-shaped form, the steps which consist in passing the ends of the bristles across a grinding surface in grinding engagement therewith to shift the areas of grinding contact progressively across the ends of the bristles from side to side of the axes thereof and simultaneously slightly flexing the bristles in changing planes to progressively change the angle of grinding contact so as to round the ends of the bristles.

11. The method of rounding the tips of flexible brush bristles to a smooth end formation, comprising the presentation of the end faces of said bristles to a grinding medium to render the same blunt and rounded for substantially the normal width of the bristles, and while the bristles are in grinding engagement, effecting slight flexure thereof in various directions to round the blunt ends and prevent the formation of sharp edges between the blunt end faces and the adjoining sides of the bristles.

12. The method of grinding the working tips of flexible brush bristles, comprising the presentation of the end faces of assembled bristles to a grinding means, causing relative travel between said means and the bristle ends generally cross-wise of said ends to blunt the same, and while said bristles are thus being ground changing the angularity of contact between the bristle ends and grinding means laterally of the direction of said travel to impart to the bristle ends a generally dome-shaped configuration.

13. The method of grinding the working tips of flexible brush bristles, comprising the engagement of the end faces of assembled bristles with a grinding medium to blunt the same, effecting relative travel between the bristles and grinding medium, progressively changing the angularity of presentation of the blunt bristle ends to the grinding medium during said course of travel, and while said bristles are thus being ground also progressively changing the angularity of the relationship between the blunt bristle ends and the grinding medium in directions transversely to said course of travel.

14. The method of forming blunt, smooth, rounded ends on a group of flexible bristles, which consists in passing the group of bristles over a grinding wheel in a path transverse to the axis of the wheel and with the free ends of the bristles in grinding engagement with the wheel, the ends of the bristles being engaged with the wheel with sufficient pressure to cause the bristles to flex slightly as the ends of the bristles pass over the wheel, and simultaneously varying the angular relation between the surface of the wheel and the ends of the bristles in contact therewith in a direction transverse to the path of travel of the group of bristles, whereby the ends of the bristles are ground to a generally dome shape.

15. A grinding wheel for grinding the tips of brush bristles, said wheel having a grinding surface and being provided with deflecting formations varying in shape at different points in the circumference of the wheel for deflecting the tips of bristles coming in contact with said grinding surface, said formations being of substantially greater magnitude than the natural irregularities of the grinding surface, whereby the tips of the bristles are caused to be deflected relatively to the grinding surface during grinding and tend to become rounded.

16. A grinding wheel for grinding the tips of brush bristles comprising a plurality of abrasive discs, each of a thickness equal to more than twice the diameter of the individual bristles to be ground, separating discs mounted between the abrasive discs, the peripheries of the separating discs projecting slightly beyond the abrasive discs so as to provide non-abrasive separating flanges dividing the grinding wheel into zones, and bristle deflecting formations in each zone spaced about the circumference of the wheel for deflecting bristles coming in contact with the surface of the grinding disc in such zone, said formations being of substantially greater magnitude than the natural irregularities of the grinding surface, whereby the tips of the bristles are caused to be deflected relatively to the grinding surface during grinding and tend to become rounded.

17. An abrasive wheel for grinding the tips of brush bristles comprising composite abrasive discs each formed of layers of fibrous material having granular abrasive material between them and non-abrasive separating discs between the composite abrasive discs, said separating discs being of larger diameter than the abrasive discs so as to provide projecting edges for separating the bristles into groups.

HEREWARD LESTER COOKE.